US009449411B2

(12) United States Patent
Cok et al.

(10) Patent No.: US 9,449,411 B2
(45) Date of Patent: Sep. 20, 2016

(54) RANKING IMAGE IMPORTANCE WITH A PHOTO-COLLAGE

(75) Inventors: Ronald Steven Cok, Rochester, NY (US); Daniel Lynn Ahlberg, Pleasanton, CA (US)

(73) Assignee: Kodak Alaris Inc., Rochester, NY (US)

( * ) Notice: Subject to any disclaimer, the term of this patent is extended or adjusted under 35 U.S.C. 154(b) by 279 days.

(21) Appl. No.: 13/097,585

(22) Filed: Apr. 29, 2011

(65) Prior Publication Data
US 2012/0275704 A1 Nov. 1, 2012

(51) Int. Cl.
*G06K 9/62* (2006.01)
*G06T 11/60* (2006.01)
*H04N 1/00* (2006.01)
*G06F 17/30* (2006.01)

(52) U.S. Cl.
CPC ......... *G06T 11/60* (2013.01); *G06F 17/30259* (2013.01); *H04N 1/00196* (2013.01)

(58) Field of Classification Search
None
See application file for complete search history.

(56) References Cited

U.S. PATENT DOCUMENTS

| 7,271,809 | B2 | 9/2007 | Fedorovskaya et al. | |
| 7,307,636 | B2 | 12/2007 | Matraszek et al. | |
| 7,587,068 | B1* | 9/2009 | Steinberg et al. | 382/118 |
| 2007/0177805 | A1 | 8/2007 | Gallagher | |
| 2008/0069480 | A1* | 3/2008 | Aarabi et al. | 382/305 |
| 2008/0205789 | A1* | 8/2008 | Ten Kate et al. | 382/284 |
| 2009/0232400 | A1* | 9/2009 | Terayoko | 382/195 |
| 2009/0313267 | A1* | 12/2009 | Girgensohn | G06F 17/30058 |
| 2010/0020224 | A1* | 1/2010 | Hattori et al. | 348/333.11 |
| 2010/0322521 | A1* | 12/2010 | Tal | G06T 11/60 |
| | | | | 382/199 |
| 2011/0016406 | A1* | 1/2011 | Grosz et al. | 715/741 |

FOREIGN PATENT DOCUMENTS

WO  WO 2009156905 A1 * 12/2009 ............. H04N 1/387

* cited by examiner

*Primary Examiner* — Sumati Lefkowitz
*Assistant Examiner* — Ryan P Potts
(74) *Attorney, Agent, or Firm* — Hogan Lovells US LLP

(57) ABSTRACT

A method of ranking the importance of digital images from a collection of images, including using a processor to operate upon a photo-collage identifying digital images in the image collection to rank the importance of one or more of the digital images based on the photo-collage, and associating the importance ranking of the one or more digital images with the corresponding one or more digital images.

17 Claims, 6 Drawing Sheets

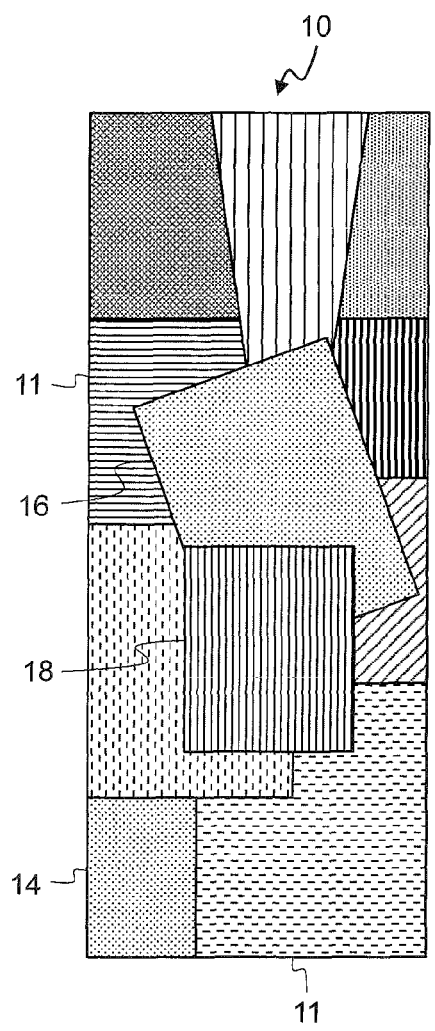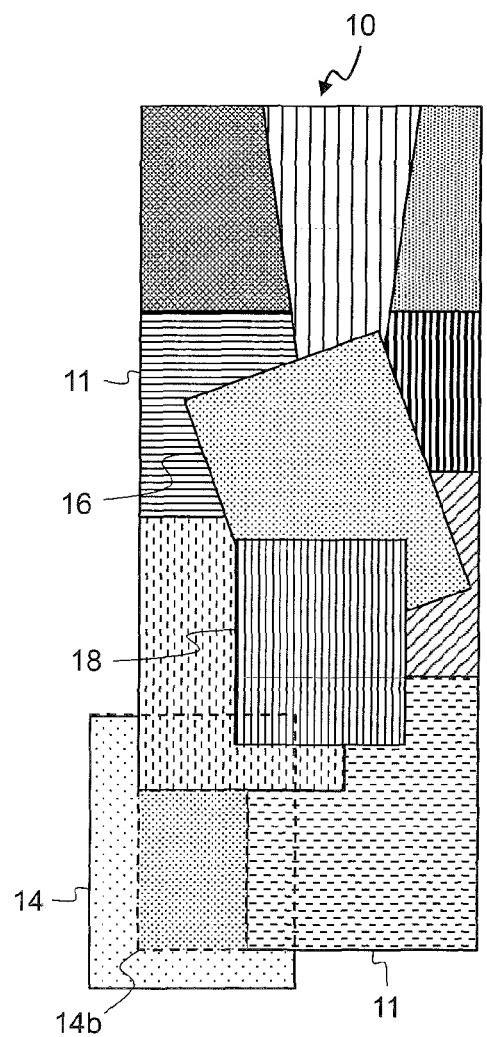
FIG. 3   FIG. 4

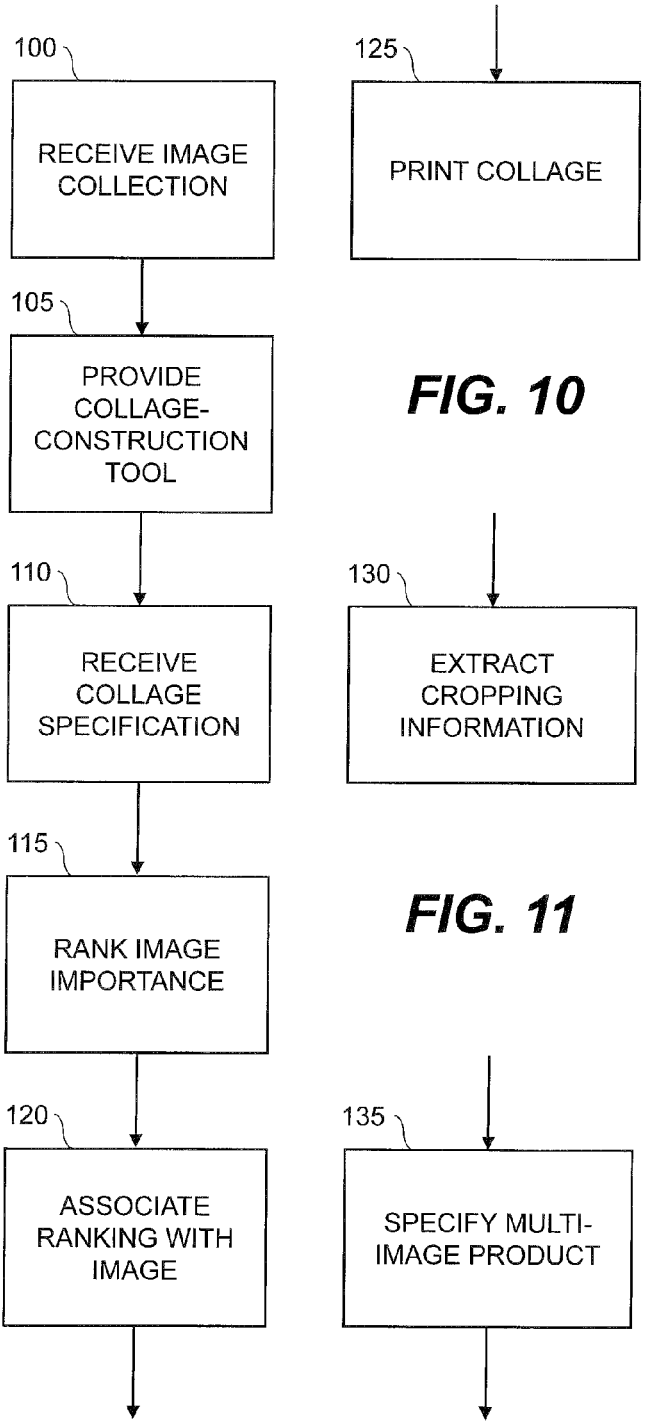

RANKING IMAGE IMPORTANCE WITH A PHOTO-COLLAGE

FIELD OF THE INVENTION

The present invention relates to image collections and, more particularly to ranking the relative importance of images in an image collection using a photo-collage.

BACKGROUND

Products that include images are a popular keepsake or gift for many people. Such products typically include a picture taken by an individual that is inserted into a product intended to enhance the product, the presentation of the image, or to provide storage for the image. Examples of such products include picture albums, photo-collages, posters, picture calendars, picture mugs, picture ornaments, picture mouse pads, and picture post cards.

Images can also be combined with other images, for example templates including background images and one or more image openings into which an individual's image can be inserted, either mechanically or electronically with a computer, to form a combined image that displays the individual's image in a pleasing or preferred manner. These image products can be provided in hard-copy form, for example as a printed photo-book, or in electronic form presented by a computer, for example in an on-line album. Imaging products can also include multi-media products, especially when in electronic form, that, for example, can include motion image sequences or audio tracks.

Many digital photographers amass large numbers of images and store them on their computer or on a photo sharing or photo merchandising web site. The images can be sorted into collections or albums that associate related images, for example images associated with a particular event. Despite the organization of images into collections, it is very often the case that a digital photographer will have many more images in a collection than can be readily used for making image products, even image products that employ multiple images, such as photo-books or calendars. Thus, users typically have to select from among the many images in a particular collection the particular images that are desired for use in a particular image product. This selection process can be very tedious and stress-inducing.

Photo-collages provide a means for presenting a number of images in a limited space by emphasizing the most important portions of the images and providing an interesting, artistic, or amusing image presentation. A photo-collage as known in the prior art is illustrated in FIG. 2. In FIG. 2, a photo-collage 10 includes a plurality of images 11. The textured patterns within the illustrated areas represent separate images. At least one image 13 overlaps another image 11 so that the overlapped image 11 is cropped and only a portion of the overlapped image 11 is visible. Thus, some images (e.g. image 11) can have portions that are apparently hidden behind other images. Other images (e.g. image 13) can be apparently in front of the other images, but have cropped portions. Other images can be completely visible and not cropped.

Photo-collages have been traditionally made by physically cutting up printed photographs and adhering them to a surface or by physically overlapping one printed photograph over another. When reproduced, a photo-collage takes on the appearance of FIG. 2. The advent of "what-you-see-is-what-you-get" representative graphic user interfaces and electronic image processing software on computers has enabled the design and layout of electronic photo-collages. These photo-collages can be rendered as a single, large image and printed, emailed, or viewed electronically. Regardless of the method of making a photo-collage, photo-collage include image selected from a collection of images.

A number of prior-art methods for selecting images from a collection of images are known. For example, U.S. Patent Publication 20070177805 describes a method of searching through a collection of images, includes providing a list of individuals of interest and features associated with such individuals; detecting people in the image collection; determining the likelihoods for each listed individual of appearing in each collection image in response to the detected people and the features associated with the listed individuals; and selecting in response to the determined likelihoods a number of collection images such that each individual from the list appears in the selected number of collection images. This enables a user to locate images of particular people but does not necessarily assist in finding suitable images for a particular image product.

It is known to preferentially select favorite images for use in a photo-product or to use a favorite image as the largest or most noticeable image in a group display of images. For example, U.S. Pat. No. 7,307,636 describes making photo-products using preferred images. In one example, a 5-picture album page employs a favorite picture as the center, largest image.

U.S. Pat. No. 7,271,809 describes a method for using viewing time to determine affective information in an imaging system that is employed to estimate user preferences for an image. This enables a user to locate preferred images for image collections that are frequently reviewed.

Prior-art methods of selecting images from a collection can be tedious, difficult, and inaccurate. There is a need, therefore, for an improved method to determine user preferences for images in a collection.

SUMMARY OF THE INVENTION

In accordance with the present invention, there is provided a method of ranking the importance of digital images from a collection of images, comprising:

using a processor to operate upon a photo-collage identifying digital images in the image collection to rank the importance of one or more of the digital images based on the photo-collage; and associating the importance ranking of the one or more digital images with the corresponding one or more digital images.

In accordance with another embodiment of the present invention, there is provided a system for ranking image importance in a collection of images, comprising:

a server computer connected to a remote client computer through a computer network, the server computer:

using a processor to operate upon a photo-collage identifying digital images in the image collection to rank the importance of one or more of the digital images based on the photo-collage; and associating the importance ranking of the one or more digital images with the corresponding one or more digital images.

The present invention has the advantage of determining user preferences for images in an enjoyable and intuitive way.

BRIEF DESCRIPTION OF THE DRAWINGS

The above and other features and advantages of the present invention will become more apparent when taken in conjunction with the following description and drawings wherein identical reference numerals have been used, where possible, to designate identical features that are common to the Figures, and wherein:

FIG. 3 illustrates a photo-collage presentation having a rotated image and a cropped image according to an embodiment of the present invention;

FIG. 4 illustrates a cropping detail of the photo-collage presentation of FIG. 3;

FIGS. 9-13 are flow charts illustrating various embodiments of the present invention.

DETAILED DESCRIPTION OF THE INVENTION

According to the present invention, an image product is a product that includes images incorporated into an image-related object, such as for example a photo-book, a picture greeting card, a photo-collage, a picture mug, or other image-related product. The image products can include templates. The images can be a user's personal images and the image product can be personalized. The images can be located in specified pre-determined locations or can be adaptively located according to the sizes, aspect ratios, orientations or other attributes of the images. Likewise, the image sizes, orientations, or aspect ratios included in the image product can be adjusted, either to accommodate pre-defined templates with specific pre-determined openings or adaptively adjusted for inclusion in an image product.

Figures 1, 2:
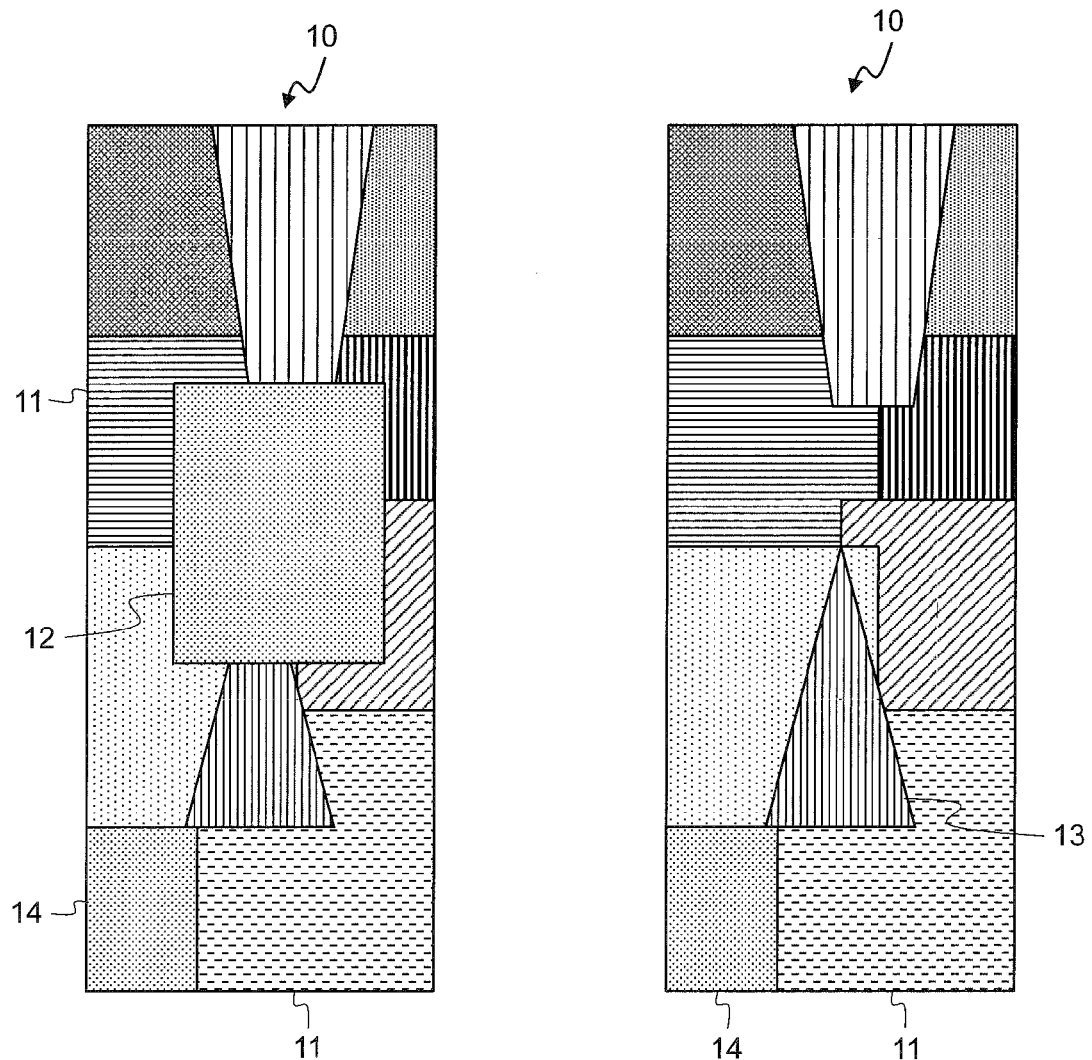
FIG. 1 illustrates a photo-collage presentation having a central, large image according to an embodiment of the present invention.
FIG. 2 is a prior-art illustration of a photo-collage.

As used herein, a photo-collage is an image product that includes a plurality of image elements or multi-media elements. The multi-media elements can include, for example, still images, video images, or audio components, but must include at least one image. For clarity of illustration herein, still images will be referred to and illustrated in the Figures, but the present invention is not limited to only single, still images. The image(s) in a photo-collage are combined on a single surface or area and at least some of the images can overlap other images so that the visible portion of the overlapped images in the photo-collage is less than the entire overlapped image. Thus, a portion of the overlapped image is hidden behind other images. FIG. 2 illustrates a prior-art photo-collage having images 11, 13, and 14 in different positions in the photo-collage.

A photo-collage image product can be represented electronically in a variety of ways, for example as a single image including the plurality of image elements. Alternatively, the photo-collage image product can be represented as a specification of a plurality of image elements or multi-media elements and their arrangement, for example as a list of image elements or multi-media elements together with organization information describing their layout in the photo-collage stored in an electronic computer-accessible file. In the various representations or specifications of a photo-collage, images included in the photo-collage are identified, for example by including the images or by including references to the images. A photo-collage image layout includes such attributes as location, size, cropping, and orientation of the identified image. As used herein with respect to the present invention, a reference to a photo-collage includes any of these representations or specifications and is not limited to any particular representation or specification of a photo-collage.

According to an embodiment of the present invention, a photo-collage of images can be employed to determine the relative importance of the images in a collection of images. Relative image importance can also be considered to be relative value or usefulness to an owner or user of the images in the image collection.

In an embodiment of the present invention, a method of ranking the importance of digital images from a collection of images includes using a processor to operate upon a photo-collage to rank the importance of one or more of the digital images identified in the photo-collage. The photo-collage identifies digital images in the image collection that are used in the photo-collage, for example as an image of the photo-collage or as a specification or reference in the photo-collage. The importance ranking of the one or more digital images is associated with the corresponding one or more identified digital images. The operation can be performed by a processor using any of a variety of photo-collage representations or specifications. The photo-collage can include two or more images and one or more of the images are identified and the relative importance of the identified image(s) ranked. The identified images can be stored in a storage device accessible to the processor, together with the photo-collage or photo-collage specification, and associated importance ranking information.

Referring to the flow diagram of FIG. 9, an embodiment of the present invention includes receiving a collection of images including two or more digital images from a user in step 100, providing a collage-construction tool to the user in step 105, receiving a photo-collage specification from the user in step 110, the photo-collage specification identifying two or more of the digital images in the collection of images, ranking the importance of the two or more identified digital images based on the photo-collage specification to make an importance ranking for one or more of the identified digital images in step 115, and associating the importance ranking of the one or more identified digital images with the one or more identified digital images in step 120.

Referring to FIG. 1, the collection of images can include the images 11 used to make a photo-collage 10. The photo-collage specification specifies the layout, position, size, orientation, or shape of the images 11 in the photo-collage 10. According to embodiments of the present invention, some of the images 11 can be positioned more centrally than others. For example, image 12 is positioned nearer to the center of the photo-collage 10 than is image 14. According to other embodiments of the present invention, some of the images 11 can be larger than others in the photo-collage 10. For example, image 12 is larger than is image 14 in the collage. The size of an image is taken to be the size of the image that is shown in the photo-collage 10, not necessarily the size of the underlying image itself. For example, a very large image can be cropped to a small image and the small cropped portion of the image used in the photo-collage 10. In that case, the small cropped portion of the image represents the size of the image 11 in the photo-collage 10.

Referring to FIG. 3, according to another embodiment of the present invention, some of the images 11 can be rotated with respect to the edges of the photo-collage 10. For example, image 16 is rotated with respect to the edges of the photo-collage 10 while image 18 has borders aligned with the edges of the photo-collage 10. Referring to FIG. 4, an image 14 can be cropped to provide a smaller, cropped image 14b that is used in the photo-collage 10. As shown in FIG. 4, underlying image 14 is larger than cropped image portion 14b.

The attributes of an image 11 in a photo-collage 10 can be used to determine a relative importance ranking of the images. A variety of importance metrics can be employed according to various embodiments of the present invention. For example, an image that is more centrally located in the photo-collage can be presumed to be more important, for example as are image 12 in FIG. 1 and images 16 and 18 in FIGS. 3 and 4. Correspondingly, images that are less centrally located, for example less-centrally-positioned image 14 (14b) and images 11 in FIGS. 1, 3, and 4 can be presumed to be less important for that reason.

Similarly, an image 11 in the photo-collage 10 that is relatively larger than another image 11 in the photo-collage 10 can be presumed to be more important and an image 11 in the photo-collage 10 that is smaller can be presumed to be less important. For example, in FIG. 1 image 12 is relatively larger than image 14 and can be presumed to be more important while relatively smaller image 14 can be presumed to be less important.

Another useful metric can be the rotation of an image with respect to the edges of the photo-collage 10. If an image, for example image 16 in FIG. 3, has edges that are rotated with respect to the edges of the photo-collage 10, it can be presumed to be less important, for example than an image whose edges are not rotated with respect to the photo-collage edges, for example image 18. By rotated is meant that the edges of the image are not parallel or orthogonal to the edges of the collage. In some cases images (or a photo-collage) might not be rectangular, in which case this metric can be abandoned as not relevant or useful.

In yet another embodiment of the present invention, the amount of time that a user spends interacting with an image 11 in the photo-collage 10 can be presumed to indicate a relative importance of the image 11. Similarly, images in a collection that are not included in a photo-collage can be presumed to be less important.

In another useful embodiment of the present invention, the portions of cropped images 14b that are used in the photo-collage 10 can be an indicator of the relatively greater importance of that portion of the image 14 with respect to other portions of the image 14. For example, portion 14b of image 14 illustrated in FIG. 4 is shown in the photo-collage 10 and the remainder of the image 14 is cropped out. The cropped image portion 14b can then be presumed to be more important than other portions of image 14.

Not all metrics are useful in every situation, nor is every metric consistent with every other metric. Referring, for example, to FIG. 3, images 16 and 18 are both centrally located within the photo-collage 10 and can be presumed to be more important than other images in the photo-collage for that reason. Moreover, image 16 is larger than image 18 and can thus be presumed to be more important than image 18. Image 16, however, is rotated with respect to the photo-collage 10 while image 18 is not, implying that image 18 is more important than image 16. Hence, different metrics can imply different relative importance among images.

One specific metric can indicate that one image is relatively more important than another, all other importance rankings being equal. An importance ranking can be a binary value (implying that one image is more important than another without specifying a degree of importance) or a continuous value (implying a degree of importance). When combining different importance metrics, continuous metrics can be combined according to a continuous function or equation. Alternatively binary importance metrics can be counted to determine whether one image is more important than another (i.e. if one image is more important than another according to two metrics and less important than the other according to one metric, the one image is considered to be more important than the other image).

In an embodiment of the invention, various metrics are combined to provide a combined metric and an overall relative importance to the images in a collage. It can also be advantageous to combine other user input from other sources (such as direct user image choice, image sharing behaviors to the image importance derived from a photo-collage 10 to provide a more complete importance indicator. Alternatively, other user input from other sources (such as direct user choice, sharing behaviors) can be used to determine the relative weighting of the various metrics.

Once a photo-collage is specified, and the image importance ranked according to the desired metrics, the importance ranking of each image 11 can be associated with the image 11, for example by storing the ranking information with the image 11 in an image header or in an associated file or in a database. The photo-collage 10 can be printed for example as shown in step 125 of FIG. 10. Cropped images (e.g. 14b) in the photo-collage 10 can also specify areas of special interest and the cropping information similarly associated with the images (step 130 of FIG. 11).

Referring to FIG. 12, it is also advantageous to combine the rankings obtained for images 11 that are used in more than one photo-collage 10. In such an embodiment, the processor operates upon a second photo-collage identifying digital images in the image collection to rank the importance of one or more of the identified digital images based on the second photo-collage. The processor combines the importance ranking of one or more of the identified digital images based on the photo-collage 10 with the importance ranking based on the second photo-collage to form a combined importance ranking; and associates the combined importance ranking of the one or more identified digital images with the corresponding one or more identified digital images.

One or more images 11 can be used in two or more photo-collages 10 and the one or more images 11 ranked in importance with respect to each of the photo-collages 10. The relative rankings obtained from different photo-collages can be combined to give a more complete importance ranking. For example, as shown in FIG. 12, a second photo-collage specification can be received in step 140, a second image importance ranking derived from the second photo-collage specification in step 145. The second importance rankings are then associated with the images in step 150, and the second importance rankings can be combined (step 155) with the original importance rankings (FIG. 9) to give a more complete importance ranking. Thus, a larger group of relative importance rankings for more images can be obtained. Even images that are not in different collages can have relative importance rankings assigned based on their relative importance with respect to other images that are common to the different collages.

Figure 5:
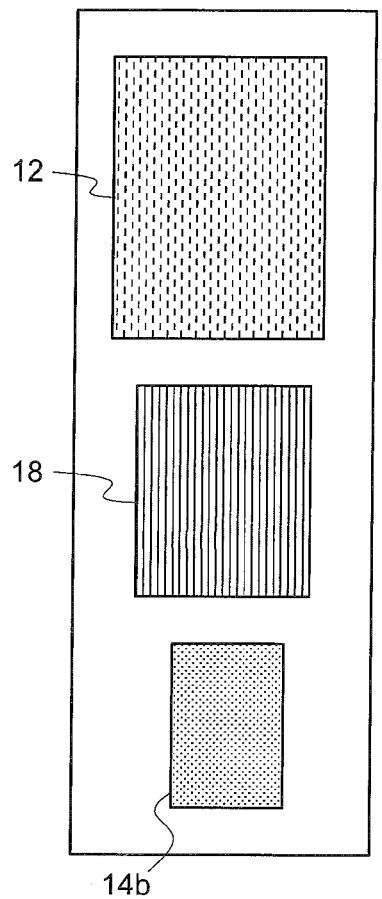
FIG. 5 illustrates a page of a multi-image product according to an embodiment of the present invention.
Figure 6:
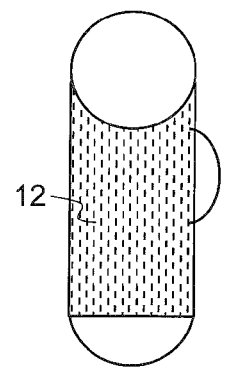
FIG. 6 illustrates an image product according to an embodiment of the present invention.

The relative importance of the images 11 within an image collection can be used to specify image choices, locations, sizes or other image attributes in an image or multi-image presentation or product. As a simple example illustrated in FIG. 5, images 12 and 18 are presumed to have a higher relative importance than other images and are used as images in a page of a multi-media product, such as a photo-book. Cropped image portion 14*b* of image 14 is used as well, illustrating that the cropping parameters specified by a user can be used to define an area of relatively greater importance in an image and that cropped area of greater importance can be preferentially used in another image product, as shown in step 135 of FIG. 13. Referring to FIG. 6, an image product (e.g. a mug) can bear an image selected from the image collection by comparing the importance rankings of the images in the collection to find the image having the greatest importance ranking that is matched to the image product.

The present invention can be employed to assist users in specifying the relative importance of images in their image collection. In an embodiment of the present invention, a user purchases a software application that executes on a computer, for example a home computer. Alternatively, the user can employ a computer having browser software to interact with web servers on the internet, provided for example by an image product merchandising business. The web servers provide graphic user interface information. Either the software application or web-server mediated graphic interface can be used to store users' images and to interact with the users to construct and specify a collage. The photo-collage specification is then analyzed to determine the relative importance of images in the photo-collage and to assign an importance ranking to each image in the photo-collage. The importance rankings are then correspondingly associated with the images.

A user can then print the collage, extract useful cropping information from the photo-collage specification, or create a second photo-collage whose specification can provide a second set of importance rankings that can be combined, for images common to both photo-collage specifications, with the original importance rankings. The importance rankings can also be used to select a preferred image or images in another image product or multi-image product. These image products can be automatically specified in response to a user's request or automatically suggested to the user without a request.

The selection, positioning, and layout of the images 11 within a photo-collage 10 can be made in a graphic user interface with a pointing device, such as a mouse, trackball, or touchpad having an associated pointing indicator, or pointer. Other means of indicating elements within a graphic user interface can also be employed and are included in the present invention. Operating switches on a control (e.g. clicking with a mouse) can also be used to select an image or multi-media element 11 as can the sequential selection of images, for example by repeatedly pressing a key, such as a tab or directional key such as an arrow key. Such graphic user interfaces are known in the art.

Figure 7:
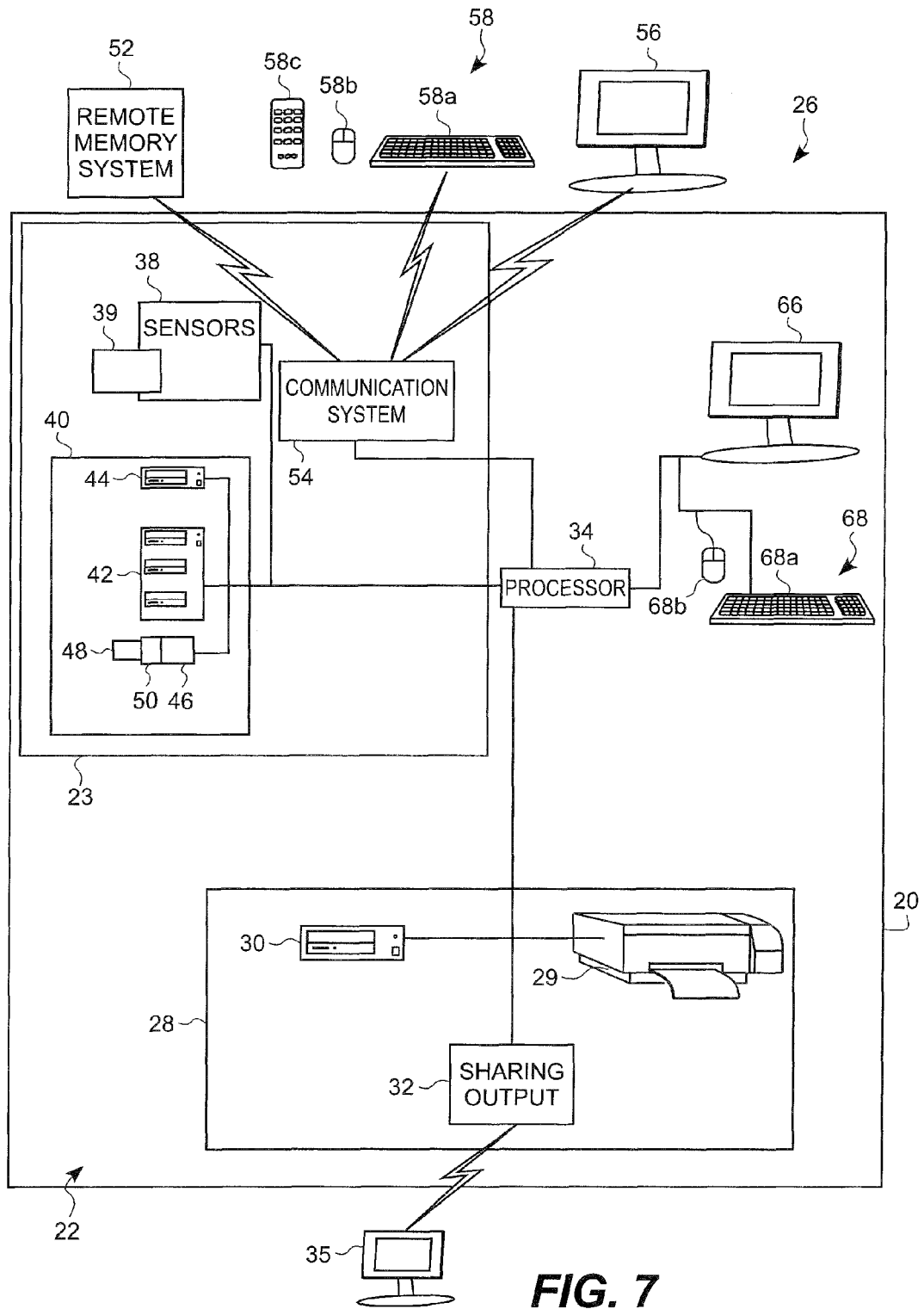
FIGS. 7 and 8 are schematic illustrations of computer systems useful for the present invention.
Figure 8:
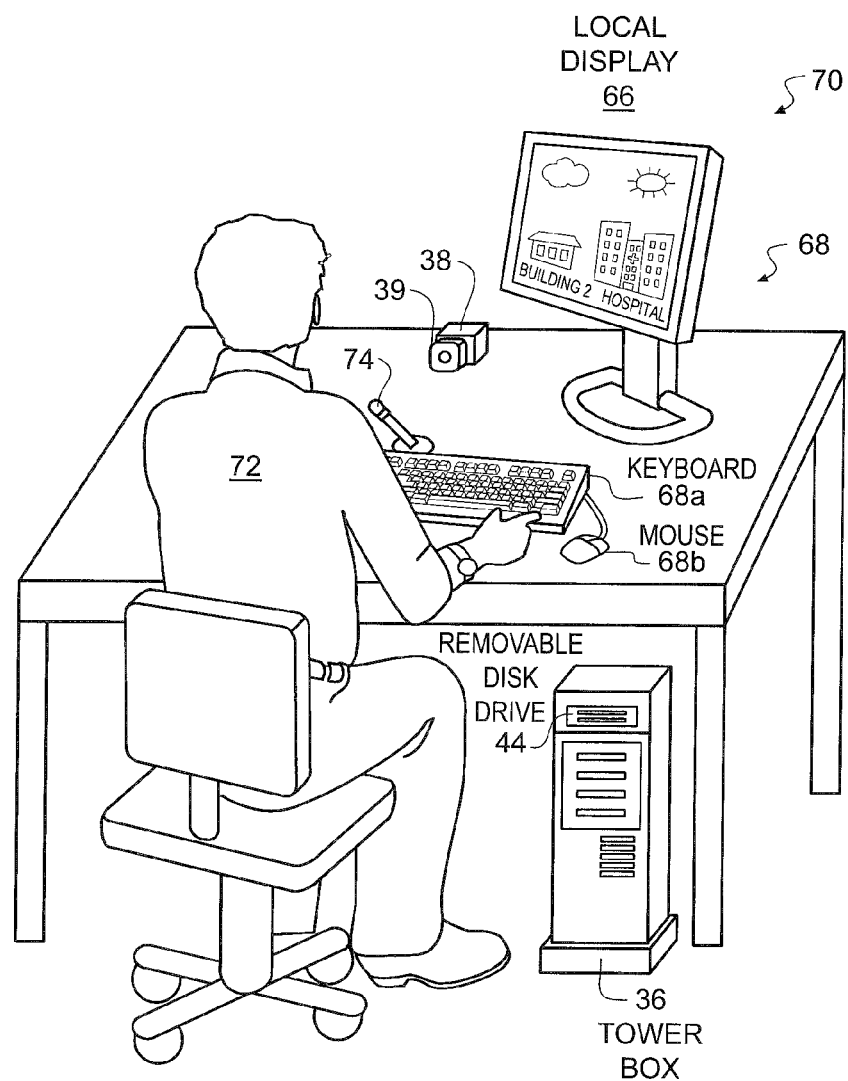

The present invention can be implemented using a variety of computers and computer systems illustrated in FIGS. 7 and 8. In one embodiment, for example, a desktop or laptop computer executing a software application can provide a multi-media display apparatus suitable for presenting multi-media photo-collage elements as described above.

In another embodiment, a computer server can provide web pages that are served over a network, for example the internet, to a remote client computer. The web pages can permit a user of the remote client computer to design and construct a multi-media element photo-collage. Application software provided by the web server to a remote client can enable presentation of selected multi-media elements, either as stand-alone software tools or provided through html, Java, or other known-internet interactive tools. In such an embodiment, a server computer is connected to a remote client computer through a computer network. The server computer uses a processor to operate upon a photo-collage identifying digital images in the image collection to rank the importance of one or more of the digital images identified in the photo-collage, and associates the importance ranking of the one or more identified digital images with the corresponding one or more identified digital images.

In this embodiment, a multi-media display system useful for the present invention can include: a server computer providing graphical user interface display elements and functions to a remote client computer connected to the server computer through a computer network, the remote client computer including a display having a graphic user interface (GUI) including a user-interactive GUI pointing device; and a plurality of multi-media elements stored on the server computer, communicated to the remote client computer, and displayed on the GUI, wherein one or more of the displayed multi-media elements of the plurality of multi-media elements apparently overlaps another of the plurality of multi-media elements so that only a portion of the overlapped multi-media elements is visible.

Computers and computer systems are stored program machines that execute software programs to implement desired functions. According to an embodiment of the present invention, a software program can execute on a computer with a display and graphic user interface (GUI) including a user-interactive GUI pointing device that includes software for displaying a plurality of multi-media elements having images on the GUI, wherein one or more of the displayed images can apparently overlap another of the displayed images so that only a portion of the one or more images is visible.

In any of these embodiments, the multi-media element can be a still image, a graphical element, or a video image sequence, and can include an audio element. The plurality of multi-media elements can form a page of images in a photo-collage arrangement.

Referring to FIGS. 7 and 8, computers, computer servers, and a communication system are illustrated together with various elements and components that are useful in accordance with various embodiment of the present invention. FIG. 7 illustrates a first embodiment of an electronic system 20 that can be used in generating an image product. In the embodiment of FIG. 7, electronic system 20 includes a housing 22 and a source of content data files 24, a user input system 26 and an output system 28 connected to a processor 34. The source of content data files 24, user-input system 26 or output system 28 and processor 34 can be located within housing 22 as illustrated. In other embodiments, circuits and systems of the source of content data files 24, user input system 26 or output system 28 can be located in whole or in part outside of housing 22.

The source of content data files 24 can include any form of electronic or other circuit or system that can supply digital data to processor 34 from which processor 34 can derive images for use in forming an image-enhanced item. In this regard, the content data files can comprise, for example and without limitation, still images, image sequences, video graphics, and computer-generated images. Source of content data files 24 can optionally capture images to create content data for use in content data files by use of capture devices located at, or connected to, electronic system 20 or can obtain content data files that have been prepared by or using other devices. In the embodiment of FIG. 7, source of content data files 24 includes sensors 38, a memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture images. Sensors 38 can also include biometric or other sensors for measuring involuntary physical and mental reactions such sensors 38 including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within system 20 or it can be removable. In the embodiment of FIG. 7, system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the embodiment shown in FIG. 7, system 20 has a communication system 54 that in this embodiment can be used to communicate with an optional remote memory system 52, an optional remote display 56, or optional remote input 58. The optional remote memory system 52, optional remote display 56, optional remote keyboard 58A can all be part of a remote system 35 having an input station having remote input controls (referred to herein as "remote input 58"), can include a remote display 56, and that can communicate with communication system 54 wirelessly as illustrated or can communicate in a wired fashion through a communication or sharing output 32. In an alternative embodiment, a local input station including either or both of a local display 66 and local input controls 68 (also referred to herein as "local user input 68") can be connected to communication system 54 using a wired or wireless connection.

Communication system 54 can include for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful embodiment, the system 20 can provide web access services to remotely connected computer systems (e.g. remote systems 35) that access the system 20 through a web browser. Alternatively, remote system 35 can provide web services to system 20 depending on the configurations of the systems.

User input system 26 provides a way for a user of system 20 to provide instructions to processor 34. This permits such a user to make a designation of content data files to be used in generating an image-enhanced output product and to select an output form for the output product. User input system 26 can also be used for a variety of other purposes including, but not limited to, permitting a user to arrange, organize and edit content data files to be incorporated into the image-enhanced output product, to provide information about the user or audience, to provide annotation data such as voice and text data, to identify characters in the content data files, and to perform such other interactions with system 20 as will be described later.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 7, user input system 26 includes an optional remote input 58 including a remote keyboard 58a, a remote mouse 58b, and a remote control 58c and a local input 68 including a local keyboard 68a and a local mouse 68b.

Remote input 58 can take a variety of forms, including, but not limited to, the remote keyboard 58a, remote mouse 58b or remote control handheld device 58c illustrated in FIG. 7. Similarly, local input 68 can take a variety of forms. In the embodiment of FIG. 7, local display 66 and local user input 68 are shown directly connected to processor 34.

As is illustrated in FIG. 8, local user input 68 can take the form of a home computer, an editing studio, or kiosk 70 (hereafter also referred to as an "editing area 70") that can also be a remote system 35 or system 20. In this illustration, a user 72 is seated before a console comprising local keyboard 68a and mouse 68b and a local display 66 which is capable, for example, of displaying multimedia content, and computer system 36 including a disk drive 44. As is also illustrated in FIG. 8, editing area 70 can also have sensors 38 including, but not limited to, video sensors 39, audio sensors 74 and other sensors such as multispectral sensors that can monitor user 72 during a production session.

Output system 28 (FIG. 7) is used for rendering images, text or other graphical representations in a manner that permits image-product designs to be combines with user items and converted into an image product. In this regard, output system 28 can include any conventional structure or system that is known for printing or recording images, including, but not limited to, printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, one can appreciate that this is not necessary and that the claimed methods and apparatuses herein can be practiced with a printer 29 that prints monotone images such as black and white, grayscale, or sepia toned images. As will be readily understood by those skilled in the art, a system 20 with which a user interacts to define a user-personalized image product can be separated from a remote system (e.g. 35) connected to a printer 29, so that the specification of the image product is remote from its production.

In certain embodiments, the source of content data files 24, user input system 26 and output system 28 can share components.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components. The system 20 of FIGS. 7 and 8 can be employed to make and display an image product according to an embodiment of the present invention. The operations of the processor on the photo-collage 10 or photo-collage specification can include the use of a computer program that executes on the processor to rank the importance of one or more of the digital images stored in a memory. The computer program can include one or more non-transitory, tangible, computer-readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more processors or computers to practice the method according to the present invention.

The invention has been described in detail with particular reference to certain preferred embodiments thereof, but it will be understood that variations and modifications can be effected within the spirit and scope of the invention.

PARTS LIST 10 photo-collage
11 image, multi-media element
12 large, central image
13 image, multi-media element
14 small, peripheral image
14b cropped portion of small, peripheral image
16 rotated image
18 central image
20 system
22 housing
24 source of content data files
26 user input system
28 output system
29 printer
30 tangible surface
32 sharing output
34 processor
35 remote system
36 computer system
38 sensors
39 video or still image sensor
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
66 local display
68 local input
68a local keyboard
68b local mouse
70 home computer, editing studio, or kiosk
72 user
74 audio sensors
100 receive image collection step
105 provide collage-construction tool step
110 receive photo-collage specification step
115 rank image importance step
120 associate image ranking with image step
125 print photo-collage step
130 extract cropping information step
135 specify multi-image product step
140 receive second photo-collage specification
145 second raking image importance step
150 associate second ranking with image step
155 combine ranking with second ranking and associate with image step

The invention claimed is:

1. A method of evaluating the importance of images in a collection by executing a software program stored in a non-transitory, tangible, computer-readable storage medium with a computer processor, the method comprising the steps of:
the processor analyzing two or more attributes of a plurality of images from the collection that appear in a photo-collage, wherein the attributes comprise at least two selected from the group consisting of image layout, image position, image size, image orientation, and image shape;
the processor automatically assigning an importance ranking to each of the plurality of images from the collection that appear in the photo-collage, wherein each importance ranking is responsive to weighted importance metrics associated with the two or more attributes; and
the processor storing the assigned importance rankings in association with the collection of images.

2. The method of claim 1, wherein image size is one of the two or more attributes, and wherein the importance metric associated with image size is most heavily weighted.

3. The method of claim 2, wherein image size is one of the two or more attributes, and wherein the importance ranking is directly proportional to a size of an image relative to sizes of other images in the photo-collage when all other importance metrics are weighted equally.

4. The method of claim 1, wherein image orientation is one of the two or more attributes, and wherein the importance metric associated with image orientation is most heavily weighted.

5. The method of claim 4, wherein image orientation is one of the two or more attributes, and wherein a higher importance ranking is assigned to images that are not rotated and a lower importance ranking is assigned to images that are rotated, when all other importance metrics are weighted equally.

6. The method of claim 1, wherein image position is one of the two or more attributes, and wherein the importance metric associated with image position is most heavily weighted.

7. The method of claim 6, wherein image position is one of the two or more attributes, and wherein a higher importance ranking is assigned to images that are more centrally positioned in the photo-collage and a lower importance ranking is assigned to images that are positioned further from a center of the photo-collage, when all other importance metrics are weighted equally.

8. The method of claim 1 further comprising the step of the processor automatically extracting cropping information for each of the plurality of images in the photo-collage, wherein the cropping information indicates areas of special interest for each image.

9. The method of claim 1, wherein the photo-collage is an interactive digital photo-collage and wherein a weighted importance metric is associated with an amount of time that a user interacts with an image in the photo-collage.

10. The method of claim 1, wherein the importance ranking is further responsive to at least one type of user input selected from the group consisting of direct user image choice and user image sharing behavior.

11. A system for ranking image importance in a collection of images, comprising a server computer connected to a remote client computer through a computer network, wherein the server computer comprises a processor adapted to execute the method of claim 1.

12. The method of claim 1, wherein at least one of the images in the photo-collage is cropped and wherein a first image in the photo-collage appears to abut or overlap a second image in the photo-collage.

13. A method of evaluating the importance of images in a collection using a photo-collage construction tool, comprising:
    a server computer receiving a collection of images from a user via a remote client computer connected over a computer network;
    the server computer providing a collage-construction tool to the user via a communication over the computer network;
    the server computer receiving a photo-collage specification from the user over the computer network, wherein the photo-collage specification is generated with the collage-construction tool, wherein the photo-collage specification specifies which images from the collection are to be integrated into a photo-collage and specifies at least two image attributes for each image to be integrated into the photo-collage;
    the server computer assigning an importance ranking to each image to be integrated into the photo-collage based on the at least two specified image attributes for each image to be integrated into the photo-collage; and
    the server computer storing the assigned importance rankings in association with the collection of images.

14. The method of claim 13 further comprising the step of printing the photo-collage according to the photo-collage specification.

15. The method of claim 13 further comprising the steps of:
    the server computer receiving one or more additional photo-collage specifications from the user, wherein each of the one or more additional photo-collage specifications specifies at least two photo-collage attributes and identifies images from the collection to be integrated into a photo-collage;
    the server computer assigning an importance ranking for each image identified by the one or more additional photo-collage specifications; and
    the server computer storing the importance rankings assigned to the images identified by the one or more additional photo-collage specifications.

16. The method of claim 15, further comprising the step of the server computer automatically specifying an image product featuring one or more images from the collection, wherein the one or more images are selected for the image product based at least in part on importance ranking.

17. The method of claim 15, further comprising the step of the server computer combining multiple importance rankings assigned to a same image that is identified in two or more photo-collage specifications.

* * * * *